United States Patent
Shin et al.

(10) Patent No.: US 9,675,222 B2
(45) Date of Patent: Jun. 13, 2017

(54) CLEANING ROBOT HAVING EXPANDED CLEANING TERRITORY

(71) Applicant: YUJIN ROBOT CO., LTD., Seoul (KR)

(72) Inventors: Kyung Chul Shin, Seoul (KR); Seong Ju Park, Gunpo (KR); Min Chang, Seongnam (KR); No Soo Lee, Incheon (KR); Jae Young Lee, Gunpo (KR); Byung Kwon Moon, Seoul (KR)

(73) Assignee: YUJIN ROBOT CO., LTD., Seoul (KR)

( * ) Notice: Subject to any disclaimer, the term of this patent is extended or adjusted under 35 U.S.C. 154(b) by 0 days.

(21) Appl. No.: 14/780,952

(22) PCT Filed: Mar. 28, 2014

(86) PCT No.: PCT/KR2014/002640
§ 371 (c)(1),
(2) Date: Sep. 28, 2015

(87) PCT Pub. No.: WO2014/157974
PCT Pub. Date: Oct. 2, 2014

(65) Prior Publication Data
US 2016/0051104 A1    Feb. 25, 2016

(30) Foreign Application Priority Data

Mar. 28, 2013 (KR) .......... 10-2013-0033331
Mar. 28, 2013 (KR) .......... 10-2013-0033333
Apr. 19, 2013 (KR) .......... 10-2013-0043435

(51) Int. Cl.
| | | |
|---|---|---|
| A47L 9/00 | (2006.01) | |
| A47L 9/28 | (2006.01) | |
| B62D 61/00 | (2006.01) | |
| B62D 6/00 | (2006.01) | |
| A47L 11/40 | (2006.01) | |

(52) U.S. Cl.
CPC ............. *A47L 9/009* (2013.01); *A47L 9/2821* (2013.01); *A47L 9/2852* (2013.01);
(Continued)

(58) Field of Classification Search
CPC ...... A47L 9/009; A47L 9/2821; A47L 9/2852; A47L 11/4072; A47L 2201/00;
(Continued)

(56) References Cited

U.S. PATENT DOCUMENTS 8,521,329 B2 * 8/2013 Park .................... G05D 1/0227
700/245
2005/0166355 A1 * 8/2005 Tani ..................... A47L 9/2805
15/319
(Continued)

FOREIGN PATENT DOCUMENTS

| | | |
|---|---|---|
| CN | 101244641 A | 8/2008 |
| EP | 2 263 506 A2 | 12/2010 |

(Continued)

OTHER PUBLICATIONS

International search report for PCT/KR2014/002640 filed on Mar. 28, 2014.
(Continued)

*Primary Examiner* — Dung Van Nguyen (57) ABSTRACT

Disclosed is a cleaning robot having an expanded cleaning territory. The cleaning robot of the present invention comprises: a platform in which at least one corner of the exterior thereof has an angle of less than 90°; a first driving wheel of which the central axis is attached to the bottom portion of the platform at a predetermined first angle (θ) and a predetermined second angle (−θ) with respect to the forward direction of the platform; and a second driving wheel of which the central axis is attached to the bottom portion of the platform at the predetermined second angle (−θ) with respect to the forward direction of the platform.

16 Claims, 8 Drawing Sheets

(52) U.S. Cl.
CPC .......... *A47L 11/4072* (2013.01); *B62D 6/002* (2013.01); *B62D 61/00* (2013.01); *A47L 2201/00* (2013.01); *A47L 2201/04* (2013.01); *Y10S 901/01* (2013.01)

(58) Field of Classification Search
CPC ....... A47L 2201/04; B62D 6/002; B62D 1/00; Y10S 901/01
See application file for complete search history.

(56) References Cited

U.S. PATENT DOCUMENTS

2009/0126143 A1* 5/2009 Haegermarck ........... A47L 9/00 15/319
2010/0125968 A1* 5/2010 Ho ........................... A47L 5/00 15/319
2011/0119862 A1 5/2011 Kim et al.

FOREIGN PATENT DOCUMENTS

| | | |
|---|---|---|
| JP | 2003-39349 A | 2/2003 |
| KR | 10-2006-0108849 A | 10/2006 |
| KR | 10-0809350 B1 | 3/2008 |
| KR | 10-2008-0105535 A | 12/2008 |
| KR | 10-2009-0096198 A | 9/2009 |
| KR | 10-2010-0136885 A | 12/2010 |
| KR | 10-2012-0133345 A | 12/2012 |
| TW | 201132707 A1 | 10/2011 |
| TW | 201335715 A1 | 9/2013 |
| TW | 201435137 A | 9/2014 |

OTHER PUBLICATIONS

European Search Report for European Application No. 14775596.1 dated Nov. 9, 2016.

* cited by examiner

FIG. 1

STRAIGHT COMPONENTS CONNECTED
AT BOTH ENDS OF CURVED SURFACE
FORM ANGLE OF LESS THAN 90°

CLEANING ROBOT HAVING EXPANDED CLEANING TERRITORY

TECHNICAL FIELD

The present invention relates to a cleaning robot having an expanded cleaning territory, and more particularly, to a cleaning robot having an expanded cleaning territory capable of performing cleaning in a narrow space which is not cleaned by an existing cleaning robot.

BACKGROUND ART

With technological development, various moving robots including an educational robot, a playing robot, a cleaning robot, and the like have been released. Among moving robots, the cleaning robot has already been popularized. The cleaning robot is an apparatus that performs cleaning by suctioning foreign substances such as dust, and the like from the bottom while being driven in a section to be cleaned by itself without a user's operation.

Exterior platforms of most existing cleaning robots have a circular shape. It is impossible for circular cleaning robot to clean a corner or a walls edged territory because a main cleaning module with a main brush or an inlet is attached to the inside of a circular platform. Furthermore, it is also impossible for the circular cleaning robot to clean a space having a smaller size than the cleaning robot.

In order to solve the problem, in some existing cleaning robots, separate side brushes are mounted on left and right sides in front of the platform. The mounted side brushes rotate to the left and the right, respectively toward the center of the platform to move the dust, and other substances from outside of the main cleaning module.

However, the circular cleaning robot still has a low cleaning capability with respect to spatial areas such as the corner and the wall edge even with the existence of the side brushes. The problem similarly occurs in a quadrangular cleaning robot.

Meanwhile, generally in moving robots, including the cleaning robot a central point of the platform, including two driving wheels for movement and a rotation central point of the platform, coincide with each other and two driving wheels are parallel to a forward direction of the platform. However, the cleaning robot has a limitation in internal space utilization at the time of designing the platform. Furthermore, the existing cleaning robot in which the center point of the platform and the rotary center point of the platform coincide with each other requires two or more additional contact points by using an auxiliary wheel, and the like in order to increase a polygonal size constituted by a contact point with a ground surface in order to increase driving stability.

In the case of the existing cleaning robot, a shape such as a cross-shaped or ladder-shaped protuberance on an exterior of the driving wheel needs to be designed in order to climb an obstacle such as a threshold, or the like and in spite of the design, in the existing cleaning robot, a slip may occur on a contact surface with the wheel due to the shape of an initial contact surface, the size of the contact surface, the height of the obstacle, and the like, and as a result, a situation in which climbing is impossible may frequently occur. That is, there is a case where a cleaning territory is limited.

SUMMARY OF THE INVENTION

The present invention has been made in an effort to provide a cleaning robot having an expanded cleaning territory capable of cleaning a narrow space as compared with existing cleaning robots.

An exemplary embodiment of the present invention provides a cleaning robot including: a platform of which at least one corner of an exterior has an angle of less than 90; a first driving wheel of which a central shaft is attached to a bottom portion of the platform at a first angle $\theta$ and a second angle $-\theta$ which are predetermined in a forward direction of the platform; and a second driving wheel of which a central shaft is attached to a bottom portion of the platform at the second angle $-\theta$ which is predetermined in the forward direction of the platform.

The first and second driving wheels may be attached to the platform in any form of a toe-in form or a toe-out form.

The first and second driving wheels may be disposed upward or downward at a horizontal central line of the platform based on the forward direction of the moving robot.

In the platform, the corner having an angle of less than 90° may be a curved line, and when at least one corner has the angle of less than 90°, an angle between straight components connected at both ends of the curved surface of the platform may be less than 90°.

The platform may have two or more corners having the angle of less than 90° and a main cleaning module may exist at a portion having the largest horizontal length of the platform of the cleaning robot.

The platform may have three corners having the angle of less than 90° to form a triangular shape and the corners of the triangular shape may be curved lines.

The cleaning robot may further include a sub cleaning module disposed on at least one corner having the angle of less than 90°.

The first angle $\theta$ may be 0° or more and less than 20° and the second angle may be −0° or more and less than 20°.

The cleaning robot may further include: an upper cover disposed on an upper end of the platform and attached to the cleaning robot by moving to the bottom when force is applied from the outside; a sensor detecting movement of the upper cover when the upper cover moves to the bottom; and a determination unit determining whether preventing the cleaning robot from being stuck is required based on a sensing value detected in the sensor.

The determination unit may generate a determination signal by comparing the sensing value with at least a predetermined reference value.

The cleaning robot may further include a controller controlling the first and second driving wheels so as to avoid the cleaning robot from being stuck in response to the determination signal.

The cleaning robot may further include a bumper at the front portion, in which the upper cover is not physically coupled with the bumper.

The sensor may be a sensor measuring pressure applied to the sensor by movement of the upper cover.

The upper cover may return to a state before the upper cover moves to the lower end when external force applied to the upper cover disappears.

Therefore, according to the present invention, the cleaning robot may clean the narrow territory such as a corner, wall surface edge by entering the inside of the narrow territory as compared with an existing cleaning robot having a circular shape or a quadrangular shape and may clean up to a deeper portion of the narrow territory while rotating by making a rotational central point and a central point of the platform from be different from each other. In addition, driving stability may be improved, and a slip which may occur while climbing an obstacle such as a threshold may be reduced. Further, it is possible to reduce a problem in that a driving direction of the cleaning robot is changed by a predetermined wave in a driving environment in which the predetermined wave exists on a floor such as a carpet wave. In addition, even in the case where the cleaning robot enters a narrow territory such as a lower end of an obstacle in which a height of the lower end is slightly small, the lower end is rounded, and the lower end is made of a slightly soft material, such as a sofa, a decoration cabinet, a radiator, or the like, a maximum territory may be cleaned while preventing the cleaning robot from getting stuck.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. Hereinafter, like reference numerals refer to like elements in the description and the accompanying drawings. Therefore, a duplicated description will be omitted. Further, in describing the present invention, well-known related functions or configurations will not be described in detail when it is judged that the detailed description for the well-known related functions or configurations may unnecessarily obscure the understanding of the present invention.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, it is understood that no element is present between the element and the other element.

Unless particularly stated otherwise in the present specification, a singular form may also include a plural form. The meaning of "comprises" and/or "comprising" used in this specification does not exclude the existence or addition of aforementioned constituent elements, steps, operations, and/or device, and one or more other constituent elements, steps, operations, and/or devices.

The meaning of "comprises" and/or "comprising" used in this specification does not exclude the existence or addition of aforementioned constituent elements, steps, operations, and/or device, and one or more other constituent elements, steps, operations, and/or devices.

Figure 1:
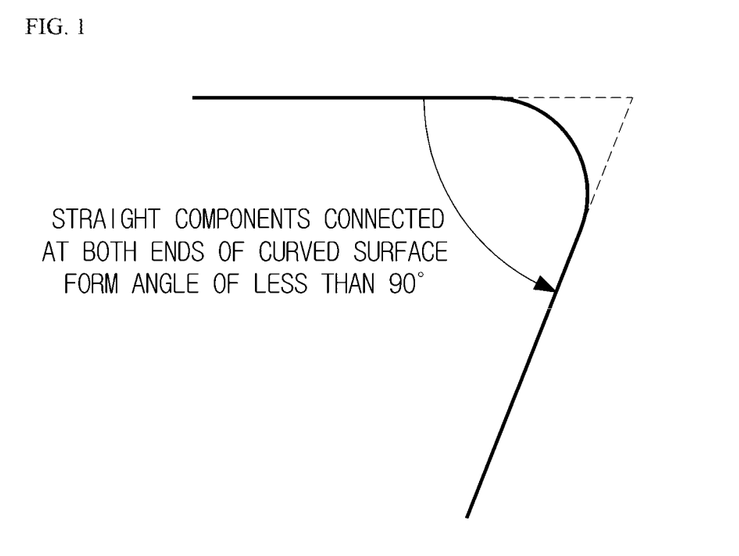
FIG. 1 is a diagram for describing a platform condition of a cleaning robot according to an exemplary embodiment of the present invention.

FIG. 1 is a diagram for describing a platform condition of a cleaning robot according to an exemplary embodiment of the present invention.

Referring to FIG. 1, at least a part of an external platform 110 of a cleaning robot according to an exemplary embodiment of the present invention may have an angle of less than 90°.

In detail, in the case where at least a part of the external platform 110 of the cleaning robot according to the exemplary embodiment of the present invention has an angle of less than 90°, an angle between straight components connected at both ends of a curved surface may be less than 90°.

That is, at least a part of the external platform 110 may have the angle of less than 90°, and in the case where an end of the portion having the angle of less than 90° has a curved shape, the angle formed between straight components connected from both ends of the curved surface may be less than 90°.

In the embodiment, an angle of at least one corner of the external platform of the cleaning robot may be an acute angle, and particularly, in the case of the external platform of the cleaning robot formed in a quadrangular type, the angle of the corner may be 60 to 85°. In the case where the angle of the corner is less than 60°, a rotation of the cleaning robot may not be smoothly operated due to a relatively pointed shape, and in the case where the angle of the corner is more than 85°, an operational problem does not occur.

However, for cleaning of the narrow territory, the angle of the corner may have a range of about 85° which is sufficiently smaller than a right angle. In the case of an external platform of the cleaning robot formed in a triangle type, the angle of the corner may be formed about 60°, and the angle of the corner may have a range of 50 to 70° when considering the rotation operation of the cleaning robot.

An example of applying a condition of the external platform 110 of the cleaning robot described in FIG. 1 will be described with reference to FIGS. 2 and 3.

Figure 2:
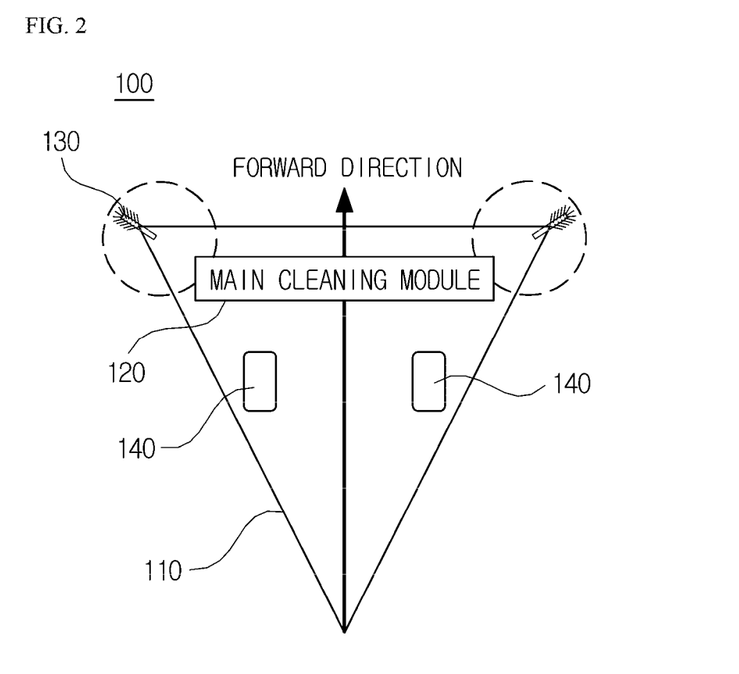
FIG. 2 is a diagram of a cleaning robot according to a first exemplary embodiment of the present invention.
Figure 3:
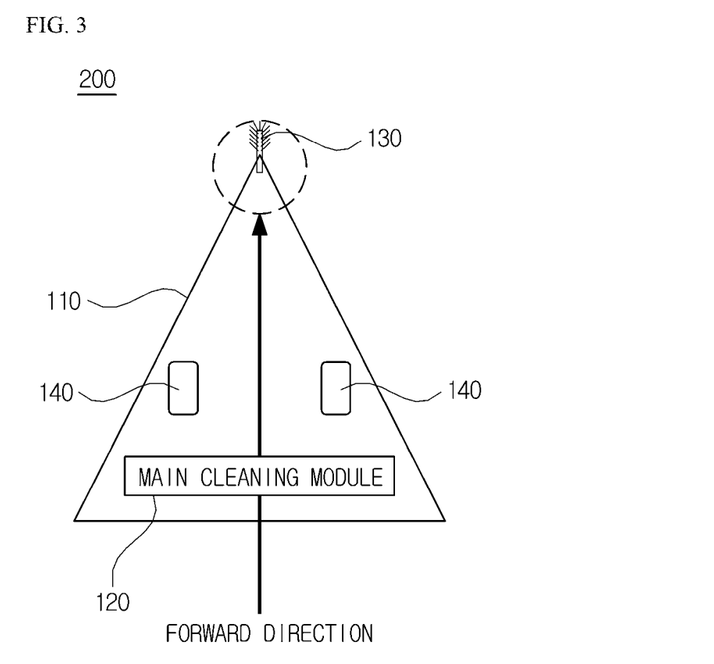
FIG. 3 is a diagram of a cleaning robot according to a second exemplary embodiment of the present invention.

FIG. 2 is a diagram of a cleaning robot according to a first exemplary embodiment of the present invention, and FIG. 3 is a diagram of a cleaning robot according to a second exemplary embodiment of the present invention.

Referring to FIGS. 2 and 3, external platforms 110 of cleaning robots 100 and 200 according to the first exemplary embodiment and the second exemplary embodiment may have triangular shapes.

That is, FIGS. 2 and 3 are examples of a cleaning robot having an external platform 110 with three or more portions having less than 90°. In FIGS. 2 and 3, a dotted circular portion becomes a portion having an angle of less than 90°.

In detail, the cleaning robot 100 having a non-circular shape according to the first exemplary embodiment described in FIG. 2 may have a reversely triangular shape based on a forward direction of the cleaning robot. On the contrary, the cleaning robot 200 having a non-circular shape according to the second exemplary embodiment described in FIG. 3 may have a triangular shape based on a forward direction of the cleaning robot.

The cleaning robot 100 according to the first exemplary embodiment may include a main cleaning module 120 having a brush or an inlet which performs cleaning, and the main cleaning module 120 may have a maximum size in external platform of triangular shape for efficient cleaning.

Accordingly, in detail, in the cleaning robot 100 according to the first exemplary embodiment, the main cleaning module 120 preferably exists at a front portion of the robot which has the largest horizontal length. The horizontal means a direction vertical to the forward direction of the cleaning robot.

In more detail, the cleaning robot 100 according to the first exemplary embodiment may have a reversely triangular shape based on the forward direction of the cleaning robot and accordingly, in the non-circular shape cleaning robot 100 according to the first exemplary embodiment, the portion having the largest horizontal length becomes the front portion of the cleaning robot.

That is, in the cleaning robot 100 according to the first exemplary embodiment, as illustrated in FIG. 2, the main cleaning module 120 may exist at the front portion of the cleaning robot.

In the cleaning robot 200 according to the second exemplary embodiment, like the cleaning robot 100 according to the first exemplary embodiment, the size of the main cleaning module 120 may also be maximized for efficient cleaning. That is, in the cleaning robot 200 according to the second exemplary embodiment, the main cleaning module 120 may exist at a rear portion of the cleaning robot having the largest horizontal length. Referring to FIG. 3, in the cleaning robot 200 according to the second exemplary embodiment which has a triangular shape, unlike the cleaning robot 100 according to the first exemplary embodiment, the main cleaning module 120 may be positioned at the rear portion of the cleaning robot.

However, in the cleaning robot 100 according to the first exemplary embodiment and the cleaning robot 200 according to the second exemplary embodiment, the main cleaning module 120 does not necessarily exist at the portion having the large horizontal length, but may exist at a portion having a smaller horizontal length than an average horizontal length of the cleaning robot or two or more main cleaning modules 120 may exist. In the case where two or more main cleaning modules 120 exist, the main cleaning modules 120 may be positioned at the front portion and the rear portion of the cleaning robot, respectively, and the maincleaning module 120 may also be positioned in a vertical direction or a diagonal direction, not the horizontal direction.

The cleaning robot 100 according to the first exemplary embodiment and the cleaning robot 200 according to the second exemplary embodiment may include one or more sub cleaning modules 130 for assisting the cleaning of the main cleaning module 120 in addition to the main cleaning modules 120. The sub cleaning module 130 may be a brush and the like which rotate for moving dust or foreign substances around the cleaning robot to the main cleaning module 120.

In detail, for example, in the cleaning robot 100 according to the first exemplary embodiment, the sub cleaning module 130 may exist at circular portions illustrated at both ends of the main cleaning module 120 illustrated in FIG. 2. That is, two sub cleaning modules 130 may be positioned one by one at the circular portions illustrated at both ends of the main cleaning module 120.

In the cleaning robot 200 according to the second exemplary embodiment, like the cleaning robot 100 according to the first exemplary embodiment, one or more sub cleaning modules 130 may exist. In detail, for example, in the cleaning robot 200 according to the second exemplary embodiment, the sub cleaning module 130 may exist at the front circular portion of a forward direction illustrated in FIG. 3. However, even in the cleaning robot 200 according to the second exemplary embodiment, two sub cleaning modules 130 may be positioned one by one at both ends of the main cleaning module 120, respectively.

When the cleaning robot 100 according to the first exemplary embodiment and the cleaning robot 200 according to the second exemplary embodiment include one or more sub cleaning modules 130, the sub cleaning module 130 may be disposed to be positioned at a front side of the main cleaning module 120 in a forward direction in order to efficiently move dust, foreign substances, or the like to the main cleaning module 120.

That is, in the cleaning robot 200 according to the second exemplary embodiment, one or more sub cleaning modules 130 may be positioned at the front circular portions positioned at the front side of the main cleaning module 120.

Figure 4:
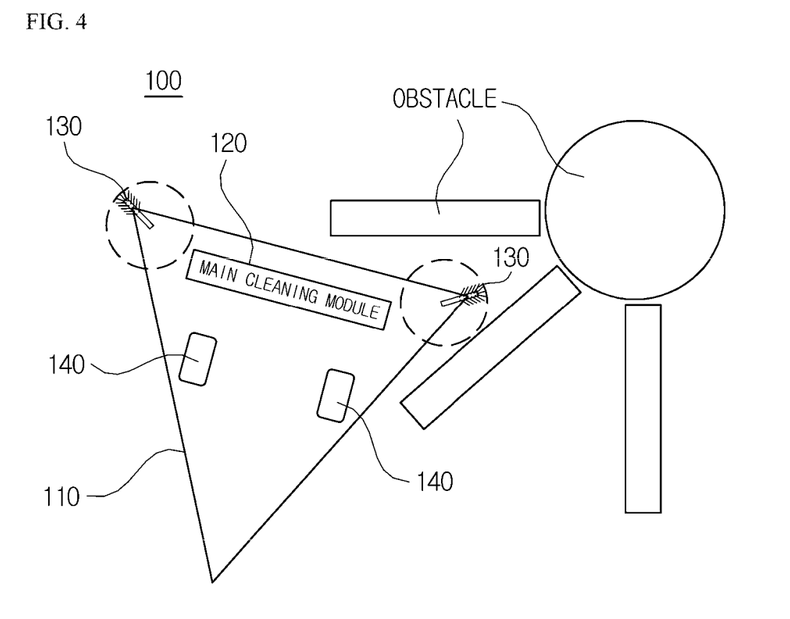
FIG. 4 is a diagram illustrating an example of a state in which the cleaning robot having a non-circular shape according to the first exemplary embodiment of the present invention cleans a narrow territory.

FIG. 4 is a diagram illustrating an example of a state in which the cleaning robot having a non-circular shape according to the first exemplary embodiment of the present invention cleans a narrow territory.

In the case of the narrow territory illustrated in FIG. 4, an existing circular or quadrangular cleaning robot cannot clean even a corner of a narrow territory, and even though the sub cleaning module 130 is used, there is a limitation on cleaning up to a deep area. However, it can be seen that the cleaning robot 100 according to the first exemplary embodiment of the present invention may clean up to a narrow territory by entering a portion having an angle of less than 90°. Particularly, in FIG. 4, in the case where the sub cleaning module 130 exists at the circular portion, the sub cleaning module 130 may clean up to a deeper territory while entering a portion having an angle of less than 90°, in which the sub cleaning module 130 exists to the narrow territory. To this end, the cleaning robot of the present invention includes at least one sensor on a front surface or both sides of the forward direction, and when the narrow territory having a predetermined angle (for example, 90°) or less is searched, a driving path may be changed so that a portion having an angle of less than 90° of the cleaning robot 10 enters the narrow territory. Here, at least one sensor may be implemented by a camera sensor, an ultrasonic sensor, an infrared sensor, and the like. For example, as illustrated in FIG. 2, in the case of the cleaning robot 100 having the reversely triangular external platform 110, when it is determined that the narrow territory exists at the front surface of the forward direction, the cleaning robot 100 may control an angle of the forward direction so that the portion having an angle of less than 90° with the sub cleaning modules 130 at both ends may be inserted into the narrow territory as illustrated I FIG. 4.

An example of applying a condition of the external platform 110 described in FIG. 1 is not necessarily the triangular shape like FIGS. 2 and 3.

In detail, the cleaning robot 100 according to the first exemplary embodiment described with reference to FIG. 2 is not necessarily the reversely triangular shape, at least one portion having the angle of less than 90° exists, and a width of the front portion of the external platform 110 of the cleaning robot may be larger than a width of a center of the external platform 110. The example will be described together with reference to FIG. 5.

Figure 5:
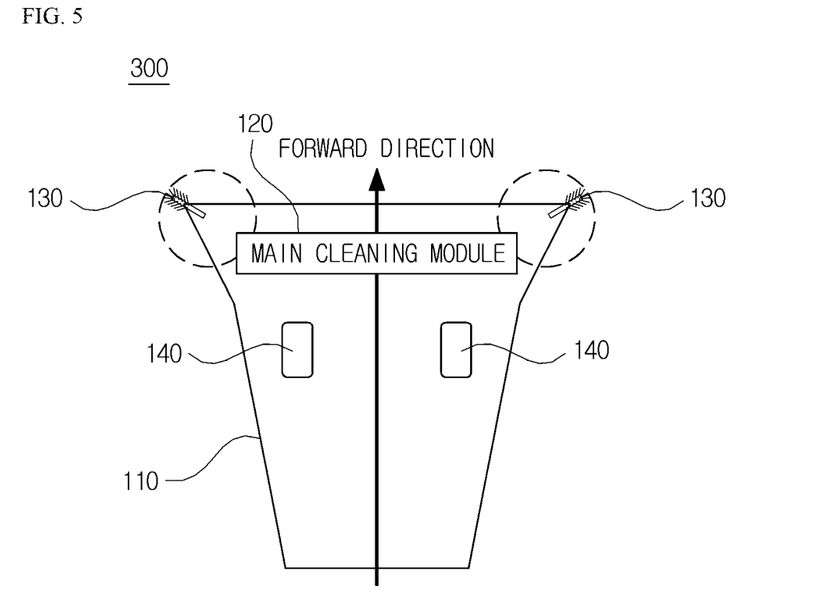
FIG. 5 is a diagram of a cleaning robot according to a third exemplary embodiment of the present invention.

FIG. 5 is a diagram of a cleaning robot according to a third exemplary embodiment of the present invention.

Referring to FIG. 5, the circular portion is a portion having the angle of less than 90°, and the width of the front portion of the external platform 110 of the cleaning robot may be larger than a width of a center of the external platform 110. Even in the cleaning robot 300 according to the third exemplary embodiment, the main cleaning module 120 may be positioned at a portion having the largest horizontal length, but the position of the main cleaning module 120 may be changed according to an intention of a designer.

That is, when the angle of at least one portion of the external platform 110 which is the condition described in FIG. 1 according to the present invention is less than 90°, all of the corresponding external shape may be included.

In FIGS. 2 to 6, the cleaning robot is illustrated in a form in which both sides are symmetrical to each other based on the forward direction, but in some cases, the cleaning robot may be implemented in an asymmetrical type in order to easily clean the narrow territory.

The cleaning robot according to the present invention may clean the narrow territory such as a corner and a wall edge by entering the inside of the narrow territory as compared with the existing circular or quadrangular cleaning robot.

That is, in the cleaning robot according to the present invention, cleaning performance may be improved as compared with the existing type of cleaning robot.

In the cleaning robot according to the present invention, the sub cleaning module 130 may entire the inside of the narrow territory as compared with the existing type of cleaning robot when the sub cleaning module 130 exists in the cleaning robot.

Figure 6:
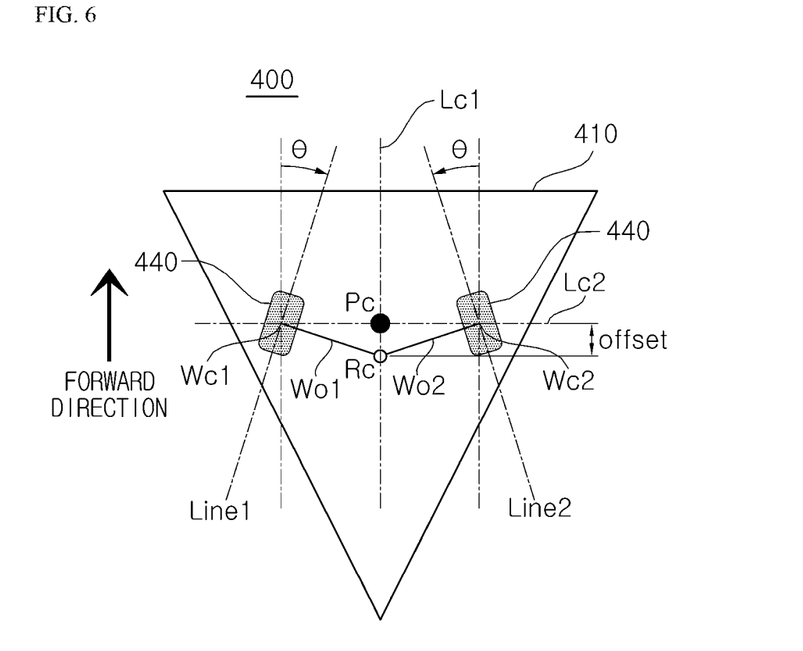
FIG. 6 is a diagram of a cleaning robot according to a fourth exemplary embodiment of the present invention.

FIG. 6 is a diagram of a cleaning robot according to a fourth exemplary embodiment of the present invention.

Referring to FIG. 6, in a cleaning robot 400 according to the fourth exemplary embodiment of the present invention, unlike the cleaning robots 100 to 300 of FIGS. 2 to 5, two driving wheels 440 are not parallel with the forward direction of a platform 410, but form a predetermined angle θ based on the forward direction of the platform 410 to be attached in a toe-in type. The two driving wheels 440 form the predetermined angle θ to be attached in a toe-in type, and as a result, a rotational central point Rc of the platform 410 may be positioned below a central point Pc of the platform 410.

The central point Pc of the platform 410 may mean a central point of a point straightly connecting the central points of two driving wheels 440 or a point where a vertical central line Lc1 of the platform 410 meets with the point straightly connecting the central points of two driving wheels 440.

The rotational central point Rc of the platform 410 becomes a point where two lines Wo1 and Wo2 extending rotation shafts of two driving wheels 440 meet with each other.

The vertical central line Lc1 of the platform 110 means a middle line in a vertical (parallel) direction based on the forward direction of the platform 410, and a horizontal central line Lc2 of the platform 410 means a middle line in a horizontal (vertical) direction based on the forward direction of the platform 410. When the platform is a circle, the point where the vertical central line Lc1 and the horizontal central line Lc2 meet each other becomes a center of the circle. However, as illustrated in FIG. 6, when the platform 410 is not the circle, the center of the platform may be the center of gravity of the platform.

The predetermined angle θ means an angle formed between a line parallel with the vertical central line Lc1 while passing the central portion Wc1 of the left driving wheel 440 and a line Line1 parallel with the direction of the driving wheel 120 while passing the central portion Wc1 of the left driving wheel 440 or an angle formed between a line parallel with the vertical central line Lc1 while passing a central portion Wc2 of the right driving wheel 440 and a line Line2 parallel with the direction of the driving wheel 120 while passing the central portion Wc2 of the left driving wheel 440. The angle formed between the line parallel with the vertical central line Lc1 while passing the central portion Wc1 of the left driving wheel 440 and the line Line1 and the angle formed between the line parallel with the vertical central line Lc1 while passing the central portion Wc2 of the right driving wheel 440 and the line Line2 may be different from each other, but may have the same angle size for movement control stability of the cleaning robot.

When the two driving wheels 440 form the predetermined angle θ based on the forward direction of the platform 410, an offset may be formed between the central point Pc of the platform 410 and the rotational central point Rc of the platform 410. The size of the offset may be changed according to an attachment position of the two driving wheels 440. Further, in the cleaning robot 400 according to the exemplary embodiment of the present invention, the rotational central point Rc of the platform 410 and the central point Pc of the platform 410 may be changed according to an attachment position of the two driving wheels 440.

Figure 7:
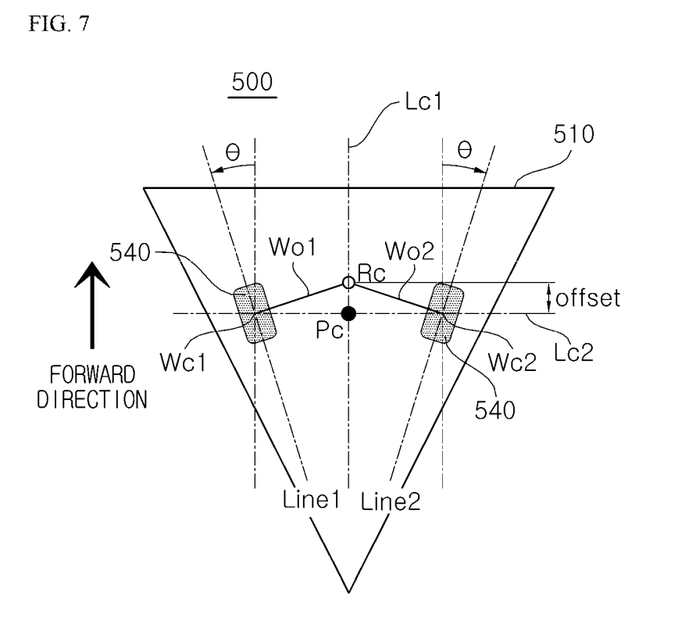
FIG. 7 is a diagram of a cleaning robot according to a fifth exemplary embodiment of the present invention.

FIG. 7 is a diagram of a cleaning robot according to a fifth exemplary embodiment of the present invention.

In FIG. 7, two driving wheels 540 of a cleaning robot 500 form a predetermined angle θ based on the forward direction of a platform 510 to be attached in a toe-out type. The two driving wheels 440 form the predetermined angle θ to be attached in a toe-out type, and as a result, a rotational central point Rc of the platform 510 may be positioned above a central point Pc of the platform 510.

That is, when the two driving wheels 540 form the predetermined angle θ based on the forward direction of the platform 510, an offset may be formed between the central point Pc of the platform 510 and the rotational central point Rc of the platform 510. The size of the offset may be changed according to an attachment position of two driving wheels 540 like the fourth exemplary embodiment which is exemplified in FIG. 6.

Like FIGS. 6 and 7, when the driving wheels 440 and 540 of the cleaning robots form the predetermined angle θ to be attached in the toe-in or toe-out type, the rotational central point Rc varies and the portion having the angle of less than 90° is inserted into the narrow territory to perform the cleaning by rotating the cleaning robot based on the rotational central point Rc, and as a result, the cleaning may be performed up to a more minute corner territory than the case where the cleaning robot rotates based on the central points Pc of the platforms 410 and 510. This is to better maintain cleanliness for the narrow territory than the case where the cleaning robot simply enters the narrow territory and then turns back.

In FIGS. 6 and 7, as an example, regardless of the attachment type of the driving wheels 440 and 540, it is illustrated that the cleaning robot has the reversely triangular platforms 410 and 510 in FIG. 2, but the cleaning robot may have a platform having the same shape as FIG. 3 or 5 or a platform having a different shape. In addition, whether the attachment type is any type of the toe-in and toe-out types may be set to efficiently rotate the portion having the angle of less than 90° according to a shape of the platform.

Figure 8:
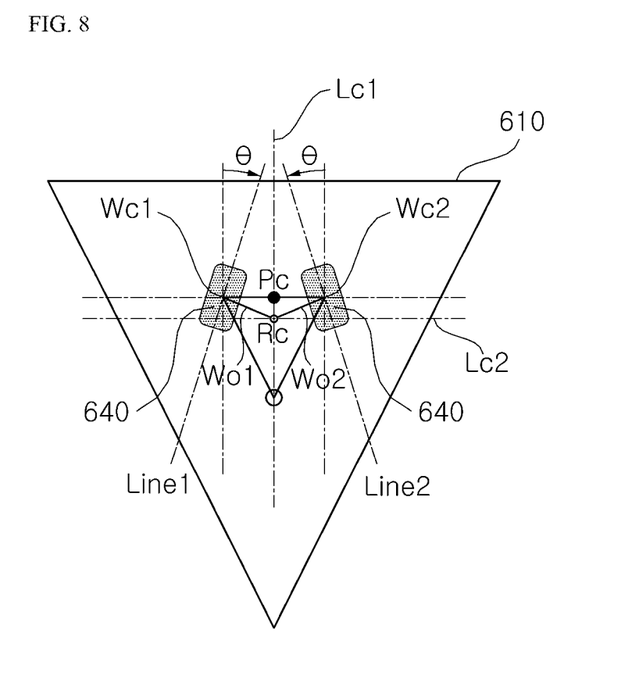
FIG. 8 is a diagram illustrating changes in a rotation central point of the platform, a central point of the platform, and an offset size according to attachment positions of two driving wheels.

FIG. 8 is a diagram illustrating changes in a rotation central point Rc of a platform, a central point Pc of a platform, and an offset size according to an attachment position of two driving wheels.

Referring to FIGS. 6 and 8, changes in the rotation central point Rc of a platform 610 and a central point Pc of the platform 610 will be described.

In the case of the existing cleaning robot in which two driving wheels are parallel with the forward direction of the platform, particularly, in the case where the platform 110 is a circle, the rotation central point Rc of the platform and the central point Pc of the platform mostly coincide with each other. However, in the cleaning robot of FIG. 6, in regard to the attachment positions of two driving wheels 440, two driving wheels are attached in the toe-in type while forming a predetermined angle θ. Further, the platform forms a non-circle.

In FIG. 6, two driving wheels 440 form the predetermined angle θ to be attached in the toe-in type, and as a result, the rotation central point Rc of the platform is positioned below the central point Pc of the platform 410.

Referring to FIG. 8, the attachment position of two driving wheels 640 does not exist in the horizontal central line Lc2 but exists at the top of the horizontal central line Lc2 unlike FIG. 6. Further, like FIG. 6, two driving wheels 640 form the predetermined angle θ to be attached in the toe-in type. Like FIG. 8, the attachment position of the two driving wheels 640 exists at the top of the horizontal central line Lc2, and as a result, the central point Pc of the platform 610 exists at the top of the horizontal central line Lc2. Further, the rotation central point Rc of the platform 610 is positioned upward based on the forward direction of the platform 610 as compared with FIG. 6.

That is, the central point Pc of the platform 610 may be changed by changing the attachment position of two driving wheels 640, and the rotation central point Rc of the platform 610 may be changed by changing at least one of the attachment position of two driving wheels 640 and the predetermined angle θ.

In detail, like FIG. 8, in the case where the attachment type of the two driving wheels 640 is the toe-in type, as the predetermined angle θ is increased, the rotation central point Rc of the platform 610 is decreased, and as the attachment position of the two driving wheels 640 is higher, the rotation central point Rc of the platform 610 is higher.

Figure 9:
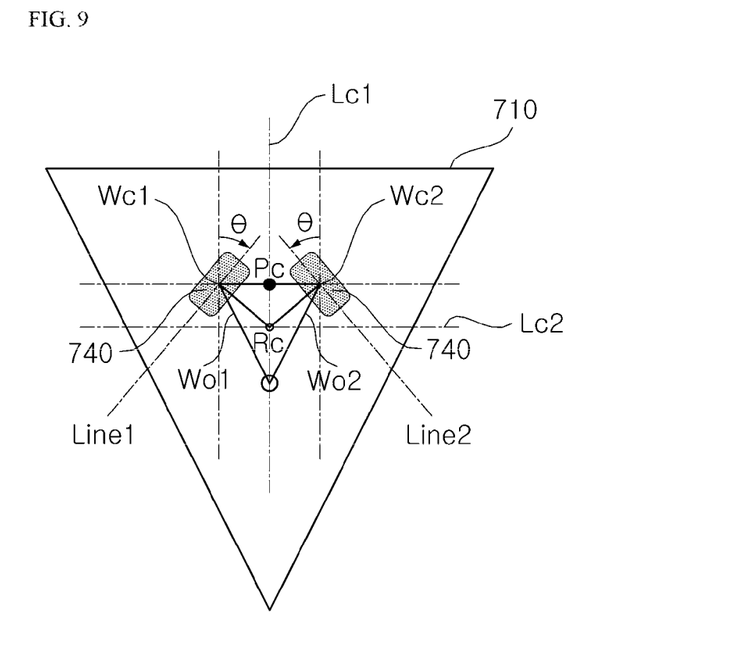
FIG. 9 is a diagram for describing an example in which the rotation central point of the platform is lowered as a predetermined angle formed when two driving wheels of the cleaning robot according to the exemplary embodiment of the present invention are attached is increased.

FIG. 9 is a diagram for describing an example in which the rotation central point Rc of the platform is lowered as a predetermine angle θ formed when two driving wheels of the cleaning robot according to the exemplary embodiment of the present invention are attached is increased.

Referring to FIG. 9, in the same condition as FIG. 8, when two driving wheels 740 are attached so that the predetermine angle θ is more than that of FIG. 8, the rotation central point Rc of the platform 710 may exist at a lower position than FIG. 8.

When the platform is the circle, in a method of to minimize a radius of rotation of the platform, the rotation central point Rc of the platform coincides with a central point of the circle of the platform. When the platform is the non-circle, in the method to minimize the radius of rotation of the platform, the rotation central point Rc of the platform coincides with the center of gravity of the platform. That is, in order to minimize the radius of rotation of the non-circular platform, in the cleaning robot, the rotation central point Rc of the platform may coincide with the center of gravity of the platform by adjusting at least one of the attachment position of the two driving wheels or the predetermine angle θ. However, as described above, for an expanded cleaning territory in the narrow territory, a portion having the angle of less than 90° inserted into the narrow territory may be configured to rotate in a range as wide as possible in the narrow territory by intentionally making the rotation central point Rc of the platform and the center of gravity be different from each other rather than minimizing the radius of rotation.

Figure 10:
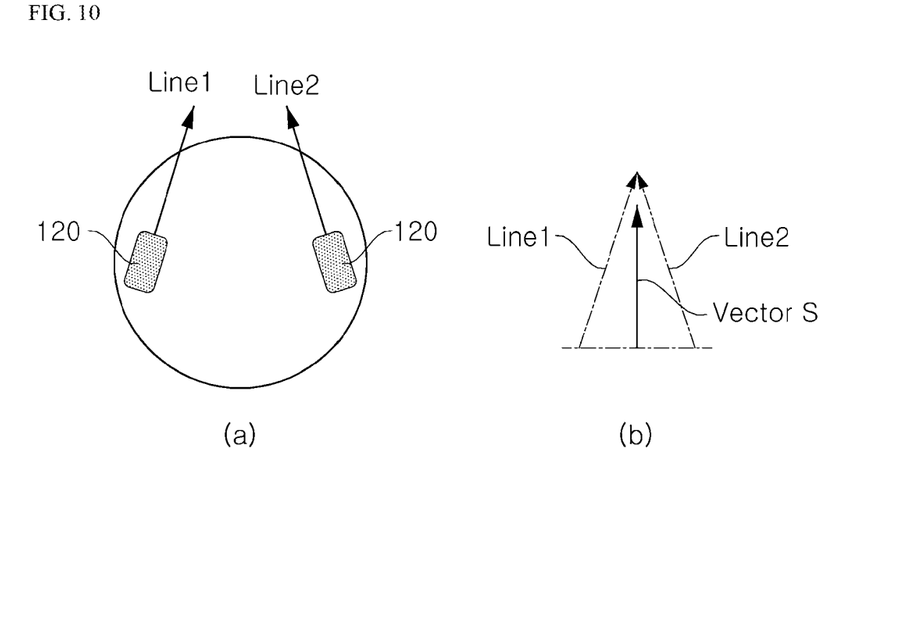
FIG. 10 is a diagram for describing a control method of the cleaning robot according to the exemplary embodiment of the present invention.

FIG. 10 is a diagram for describing a control method of the cleaning robot according to the exemplary embodiment of the present invention.

Referring to FIGS. 10A and 10B, when a method of moving the cleaning robot with improved driving performance according to the exemplary embodiment of the present invention is described, a moving robot may be driven in a straight vector VectorS direction generated by a sum of vector directions represented by two driving wheels 440, that is, a sum of Line1 and Line2. The driving of the moving robot of the type may improve straightness of the driving even in the case where a floor wave of a carpet exists. That is, in the cleaning robot with improved driving performance according to the exemplary embodiment of the present invention, generation of a drift phenomenon of the cleaning robot may be reduced according to the floor wave. Due to the characteristic of the cleaning robot of the present invention having the non-circular platform, a problem in that the portion having the angle of less than 90° contacts a wall surface or an obstacle to deteriorate the straightness may be at least partially supplemented. For example, like FIG. 2, in the case where the portion having the angle of less than 90° at one side of the cleaning robot having the reversely triangular platform proceeds in parallel with the wall surface while contacting the wall surface, due to friction with the portion contacting the wall surface, in the non-circular cleaning robot, the straightness may be largely deteriorated as compared with the circular cleaning robot. However, as described above, when the two driving wheels are attached at the predetermined angle θ, the straightness of the cleaning robot may be improved.

Particularly, the predetermined angle θ may be 0° or more and less than 20°. The predetermined angle θ may vary according to performance of the moving robot, a weight and a kind of cleaning robot, a system environment of the cleaning robot, and the like, but when the predetermined angle θ is 20° or more, the consumption of energy required for driving of the cleaning robot may be increased compared to the existing consumption. That is, the predetermined angle θ may be set by considering the energy consumed while driving.

Even more preferably, even in the case where the floor wave of a carpet exists, the straightness is ensured, and the predetermined angle θ may be 8° or more and 15° or less by considering improvement of driving stability, improving of climbing force, and energy consumption to be described later in detail. Much more preferably, the predetermined angle θ may be 10° or more and 12° or less. However, the preferable range of the predetermined angle θ may be changed according to an attachment position of the two driving wheels, the kind of cleaning robot, performance of the cleaning robot, whether sub wheels exist, a shape and a size of the platform 110, and the like.

In the cleaning robot according to the exemplary embodiment of the present invention, the stability while driving may be improved.

Improvement of the driving stability will be described in detail together with respect to FIG. 11.

Figure 11:
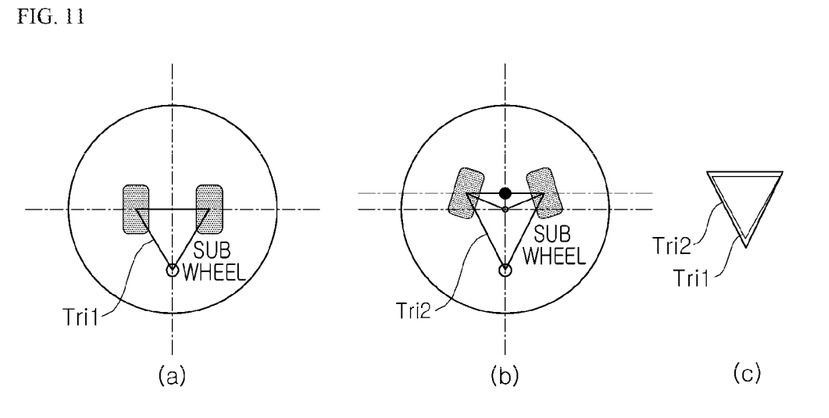
FIG. 11 is a diagram for describing a driving stability improvement effect of the cleaning robot according to the exemplary embodiment of the present invention.

FIG. 11 is a diagram for describing a driving stability improvement effect of the cleaning robot according to the exemplary embodiment of the present invention.

In FIGS. 11A and 11B, for convenience of description, the driving stability of the cleaning robot may be compared by matching conditions with the same circular platform 110, the rotational central point Rc of the same platform 110, and the existence of one sub wheel at the same position.

The fact that the driving stability of the cleaning robot is high may mean that an area of a triangle connecting the central portions of the two driving wheels 440 and the central portion of the sub wheel, that is, three points is large. That is, as the area of the triangle is increased, the driving stability may be increased.

When a triangle connecting three points in FIG. 11A is referred to as Tri1 and a triangle connecting three points in FIG. 11B is referred to as Tri2, a diagram comparing areas of Tri1 and Tri2 is FIG. 11C.

Referring to FIG. 11C, it can be seen that the area of the triangle of Tri2 may be larger than the area of the triangle of Tri1. That is, it can be seen that the driving stability of the cleaning robot in FIG. 7B is higher than that of FIG. 11A.

The cleaning robot 200 according to the exemplary embodiment of the present invention may improve climbing force by which the moving robot climbs an obstacle.

Improvement of the climbing force will be described in detail together with reference to FIG. 12.

Figure 12:
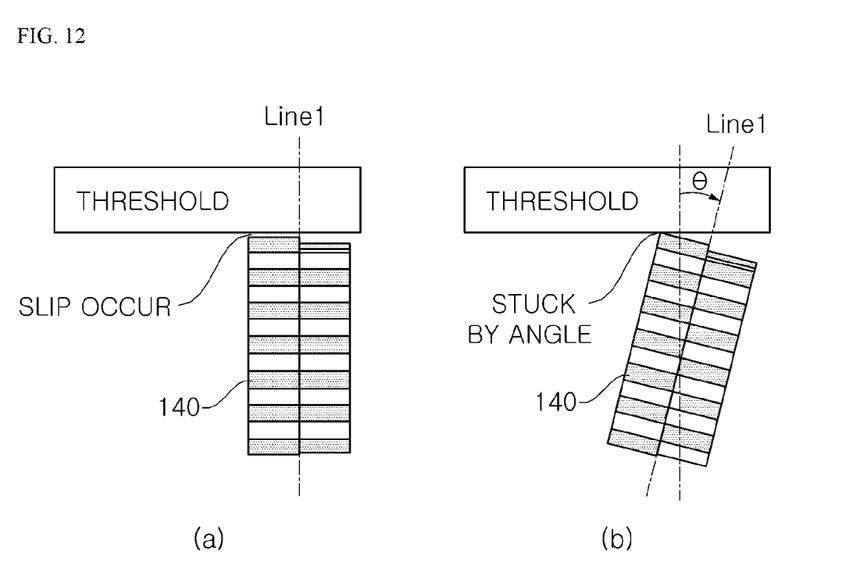
FIG. 12 is a diagram for describing a climbing force improvement effect of the cleaning robot according to the exemplary embodiment of the present invention.

FIG. 12 is a diagram for describing a climbing force improvement effect of the cleaning robot according to the exemplary embodiment of the present invention.

Referring to FIG. 12A, when the cleaning robot of the type in which the two driving wheels 440 are attached to the platform 110 in parallel climbs the obstacle having a height such as a threshold while , a slip may easily occur.

On the contrary, referring to FIG. 12B, when the driving wheels 440 are attached to the platform 410 at the predetermined angle θ and meet the obstacle having the height such as the threshold due to the predetermined angle θ, a probability that the driving wheels 440 will climb the obstacle over the obstacle without generating the slip is increased compared to FIG. 12A.

Accordingly, the cleaning robot with improved driving performance according to the exemplary embodiment of the present invention may have higher obstacle climbing ability than the existing moving robot.

That is, in the cleaning robot according to the exemplary embodiment of the present invention, as the driving wheel is attached at a predetermined angle θ, various driving performance such as improvement of rotation performance for a predetermined position of the platform, improvement of driving stability, improvement of obstacle climbing ability, and improvement of straightness in a floor having waves may be improved. Further, the moving robot with improved driving performance according to the exemplary embodiment of the present invention may easily control the cleaning robot in an environment required for obstacle avoidance, a narrow territory, and complicated trajectory and movement such as a wall climbing generated between movements of the moving robot due to various driving performance improvement.

Figure 13:
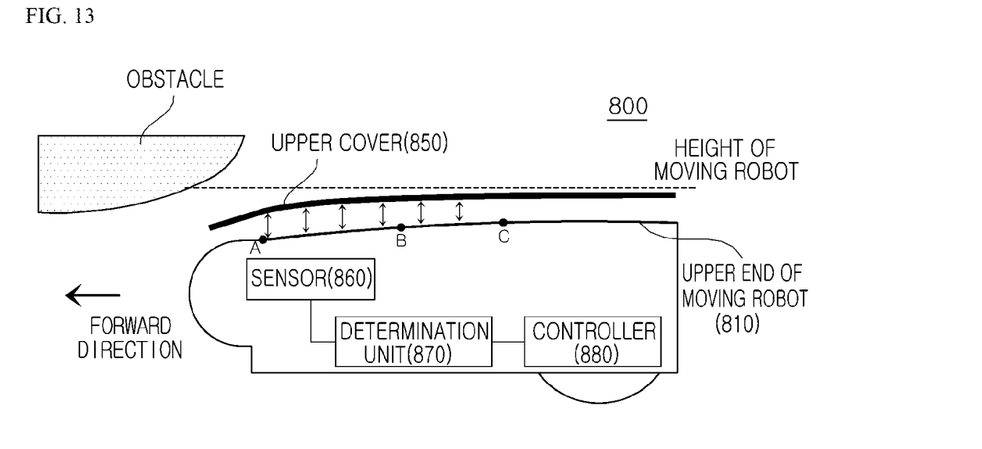
FIG. 13 is a diagram of a cleaning robot according to a sixth exemplary embodiment of the present invention.

FIG. 13 is a diagram of a cleaning robot according to a sixth exemplary embodiment of the present invention.

Hereinabove, the cleaning robot having the expanded cleaning territory for a planar narrow territory is described, but the narrow territory may have a limit in height. Further, in many cases, the planar narrow territory has the obstacle, and as a result, the planar narrow territory may be limited by the height. Hereinafter, even in the narrow territory in which the plane is limited and the height is limited, a cleaning robot having the expanded cleaning territory without generating an operation disturbance of the cleaning robot such as being stuck will be described.

Referring to FIG. 13, a cleaning robot 800 according to the exemplary embodiment of the present invention includes an upper cover 850, a sensor 860, and a determination unit 870 and may further include a controller 880.

The upper cover 850 is a cover covering the entirety of the top of the cleaning robot or all or a part of the front portion at the top of the cleaning robot.

Accordingly, the upper cover 850 may exist at the top of the cleaning robot. The upper cover 850 may be attached to an upper end 810 of the cleaning robot to be moved to the bottom portion when bottom pressing force is applied to the upper cover 850 outside. Accordingly, an empty space may exist between the upper cover 850 and the upper end 810 of the cleaning robot. Here, the upper end 810 of the cleaning robot means an upper end of the platform of the cleaning robot, and as described above, since the platform of the cleaning robot has the non-circular shape and at least a part may have an angle of less than 90°, the upper end 810 of the cleaning robot also has the non-circular shape and at least a part may have an angle of less than 90°. In addition, the upper cover 850 may be implemented in a shape corresponding to the upper end 810 of the cleaning robot to be implemented in a non-circular shape.

In the movement to the bottom, the bottom may be a vertical direction, but predetermined movement in a horizontal direction is added and the bottom may also be a diagonal direction close to the vertical direction. The bottom pressing force applied to the upper cover 850 from outside does not necessarily exist in the lower direction, but the force in the lower direction just exists. That is, in the case where the force applied from the outside is force in a diagonal direction, force of a vertical component and force in a horizontal component exist in the force in the diagonal direction, and the force of the vertical component may be force applied in the lower direction.

The degree that the upper cover 850 moves to the bottom by the external force may vary due to a material of the upper cover 850, an attachment structure of the upper cover 850, a kind of cleaning robot, a size of the cleaning robot, and the like.

For example, only the front portion of the upper cover 850 may move to the bottom based on the forward direction of the cleaning robot and the entire upper cover 850 may move. Further, even in the case where the entire upper cover 850 moves to the bottom, the front portion of the upper cover 210 may further move to the bottom than the rear portion of the upper cover 850.

In detail, when the sensor 860 is positioned at the front portion of the upper end 810 of the cleaning robot, only the portion of the upper cover 850 close to the portion where the sensor 860 is positioned may move to the bottom. Alternatively, the upper cover 850 may be designed so that the portion of the upper cover 850 close to the portion where the sensor 860 is positioned further moves to the bottom than other portions or moves to the bottom by smaller external force or may be attached to the moving robot.

When the upper cover 850 moves to the bottom when receiving the pressing force to the bottom from the outside, the sensor 860 may detect movement of the upper cover 850.

The shape of the upper cover 850 may be a straight line and a curved shape, the sensor 860 may be attached to the upper end 810 of the cleaning robot. In detail, the sensor 860 may be positioned at a place where a distance from the upper end 810 of the cleaning robot is shortest when the upper cover 850 moves to the bottom. The sensor 860 is not necessarily positioned at the place where the distance from the upper end 810 of the cleaning robot is shortest when the upper cover 850 moves to the bottom, and the sensor 860 may be widely installed at the entirety or a part of the upper end and two or more sensors 860 may be installed. However, when the sensor 860 is positioned at the place where the distance from the upper end 810 of the cleaning robot is shortest, a small number of sensors 860 may rapidly and sensitively detect the movement of the upper cover 850.

In detail, referring to FIG. 13, for example, the sensor 860 may be positioned at a point A where the distance from the upper end 810 of the cleaning robot is shortest when the upper cover 850 moves to the bottom. Alternatively, the sensor 860 may be positioned at a point B or a point C in addition to the point A in order to more accurately and sensitively detect the movement of the upper cover 850.

In FIG. 13, when the shape of the upper cover 850 or the shape of the upper end 810 of the cleaning robot is changed, the point A which has the shortest distance may be changed. However, in the cleaning robot 800 according to the exemplary embodiment of the present invention, the sensor 860 may be installed at the front portion of the upper end 810 of the cleaning robot to operate avoidance by sensing the cleaning robot before it is stuck below the obstacle so as to prevent the cleaning robot from being stuck below the obstacle. Accordingly, in the shapes of the upper cover 860 and the upper end 810 of the cleaning robot, the place where the distance from the upper end 810 of the cleaning robot is shortest when the upper cover 860 moves to the bottom may be the front portion of the upper end 810 of the cleaning robot.

However, the shortest distance is not necessarily the distance from the front portion, and the position of the shortest distance may be adjusted by forming portions that slightly protrude at a predetermined point of the upper cover 850 or the upper end 810 of the cleaning robot. When the position of the shortest distance is controlled by the protruding portions, the sensor 860 may be positioned at the protruding portion.

The sensor 860 may be a pressure sensor 860 measuring pressure applied to the sensor 860 by the movement of the upper cover 850, but is not limited thereto and may be a sensor 860 capable of detecting the movement of the upper cover 850.

When the sensor 860 senses the motion of the upper cover 850, this may mean that the upper cover 850 senses force applied from the outside.

The obstacle may vary depending on the environment in which the cleaning robot operates, but may be objects including a sofa, a bed, a decoration cabinet, a radiator, and the like, in which a lower height is small and a lower end is round or the lower end is made of a somewhat soft material.

A determination unit 870 determines whether preventing the cleaning robot from being stuck is required based on a degree sensed by the sensor 860.

In detail, the determination unit 870 determines that the cleaning robot may be stuck in the lower end of the obstacle at the moment when the upper cover 850 contacts the sensor 860 and the motion is thus sensed to determine that the prevention from being stuck is required. Alternatively, the determination unit 870 may determine that the prevention from being stuck is required according to the degree of the motion of the upper cover 850 sensed by the sensor 860.

For example, the sensor 860 is a pressure sensor, and in the case where when the upper cover 850 moves to the lower end by external force to apply pressure to the sensor 220, when the pressure applied to the sensor 860 is less than a predetermined pressure criterion Pth, the determination unit 870 may determine that the prevention of the cleaning robot from being stuck is not required. On the contrary, when the pressure applied to the sensor 860 is more than the predetermined pressure criterion Pth, the determination unit 870 may determine that the prevention of the moving robot from being stuck is required.

The predetermined pressure criterion Pth may be set differently or modified according to the size of the cleaning robot, the height of the cleaning robot, driving performance of the cleaning robot, a set-up of the user, the type of cleaning robot, and the like.

In particular, the determination unit 870 does not memorize one pressure criterion Pth but memorizes a plurality of pressure criteria Pth to transmit various determination signals to a control unit 880 for each intensity of the pressure. Further, when a plurality of sensors 860 are provided, the determination unit 870 may transmit more subdivided determination signals to the control unit 880 so that the cleaning robot performs various types of prevention operations of being stuck according to layout positions and pressure intensities of the plurality of sensors 860. In this case, the determination unit 870 may be configured to distinguish being stuck by the obstacle and a case in which the cleaning robot is stopped by people or animals.

The control unit 880 may control the cleaning robot in order to prevent the cleaning robot from being stuck when the determination unit 870 determines that the prevention of the cleaning robot from being stuck is required.

In detail, the control unit 880 may immediately stop advance of the cleaning robot when the determination unit 870 determines that the prevention from being stuck is required in order to prevent the cleaning robot from being stuck. Further, the control unit 880 may control the cleaning robot to move backward or control the cleaning robot to move backward when the cleaning robot moves to the left and the right. When the determination unit 870 transmits different determination signals according to the intensity of the pressure, the control unit 880 may reduce an advance speed of the cleaning robot or stop the advance in response to the transmitted determination signals. Further, when the determination unit 870 transmits the determination signals by analyzing the intensity of the pressure applied to each of the plurality of sensors, the determination unit 870 may determine a movement speed and a rotational direction of the cleaning robot through a difference in intensity of pressure according to the positions of the plurality of respective sensors.

That is, since the cleaning robot 800 according to the preferred embodiment of the present invention may immediately know whether the prevention of the cleaning robot from being stuck is required by pressing the upper cover 810, the control unit 990 may immediately control the cleaning robot in order to prevent the cleaning robot from being stuck.

However, the cleaning robot 800 according to the preferred embodiment of the present invention does not particularly require the determination unit 880.

In detail, in the case where an empty space exists between the upper cover 850 and the sensor 860, when the height of the empty space that exists is configured by considering the magnitude of the force applied from the outside, which may cause the cleaning robot to be stuck in the lower end of the obstacle, the cleaning robot 800 according to the exemplary embodiment of the present invention may not include the determination unit 870.

In the case where the cleaning robot 800 does not include the determination unit 870, when the upper cover 850 moves to the lower end by receiving force from the outside, the moment when the sensor 860 senses the motion is regarded as the moment when the prevention of the cleaning robot from being stuck is required, and as a result, the control unit 880 may control the cleaning robot in order to prevent the cleaning robot from being stuck.

A configuration considering the magnitude of the force applied from the outside, which may cause the cleaning robot to be stuck in the lower end of the obstacle, the configuration may be achieved by considering various conditions including the height of the cleaning robot, the size of the cleaning robot, the performance of the cleaning robot, a material of the upper cover 850, an area in which the upper cover 850 is attached to the upper end 810 of the moving robot or elastic force generated due to the attachment, the performance of the sensor 860, and the like.

Figure 14:
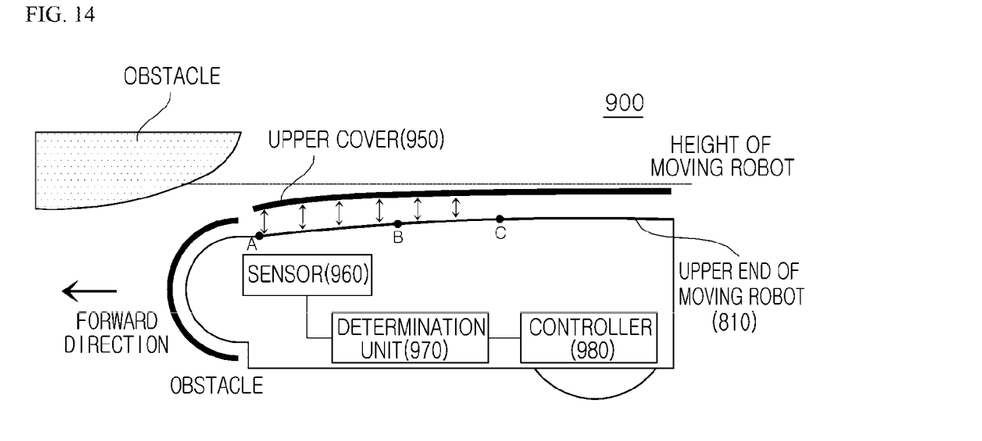
FIG. 14 is a diagram of a cleaning robot according to a seventh exemplary embodiment of the present invention.

FIG. 14 is a diagram of a cleaning robot according to a seventh exemplary embodiment of the present invention.

Referring to FIG. 14, a bumper exists in front of a cleaning robot 900. An upper cover 950 may be physically connected to the bumper, but when external force is applied to the upper cover 950, it is preferable that the upper cover 950 is not physically connected with the bumper so as to independently move to the lower end.

In FIG. 14, part K represents an upper front part of the cleaning robot. Part K may be a territory in which the bumper exists according to the form of the cleaning robot, the type of the cleaning robot, and an intention of a cleaning robot designer or user and a territory in which the upper cover 950 exists. Alternatively, the bumper may exist in a part of part K and the upper cover 950 may exist in the other part.

Alternatively, the bumper may exist only in a part of part K and the upper cover 950 may not exist in the other part, while the upper cover 950 may exist only in a part and the bumper may not exist in the other part.

As described above, the sensor 960 is preferably positioned at a point separated at a point separated from an upper end 910 of the moving robot by a shortest distance when the upper cover 950 moves to the lower end and the position may exist in part K or it may not be. When it is not, a protrusion toward the upper end 910 of the cleaning robot may be formed at a specific portion of the upper cover 950 and on the contrary, a protrusion toward the upper cover 950 may be formed at a specific portion of the upper end 910 of the cleaning robot.

The cleaning robot 900 according to the seventh exemplary embodiment described with reference to FIG. 14 does not particularly include a determination unit 970 in order to determine whether prevention from being stuck is required as described with reference to FIG. 13.

The upper cover 950 described above may exist in a form to cover the entirety of the cleaning robot upper end 910 or the entirety or a part of a front portion of the cleaning robot upper end 910 and the entirety or a part of a rear portion of the cleaning robot upper end 910 or the entirety or a part of a side of the cleaning robot upper end 910.

That is, the upper cover 950 may cover at least one of the entirety of the cleaning robot upper end 910, the entirety or a part of the front portion of the cleaning robot upper end 910, the entirety or a part of the rear portion of the cleaning robot upper end 910, and the entirety or a part of the side of the cleaning robot upper end 910. The reason is that the cleaning robot performs various operations and movements including forward movement, rotation at the same place, a change of direction, backward movement, and the like and a phenomenon may occur, in which the cleaning robot is stuck in the obstacle at not the front portion but the side and the rear portion of the cleaning robot upper end 910 while performing the operation and the movement.

When the upper cover 910 exists at the rear portion or the side portion of the cleaning robot, the sensor 960 for sensing the motion of the upper cover 910 may also exist at the rear portion or the side portion of the cleaning robot. In detail, such a case may be similar to a case in which the upper cover 950 exists at the front portion and the sensor 960 also exists at the front portion. That is, when the upper cover 950 exists at the rear portion, the sensor 960 may also exist at the rear portion and in detail, when the upper cover 950 moves, the sensor 960 may be positioned at a place where an interval between the cleaning robot upper end 910 and the upper cover 950 is the shortest.

Figure 15:
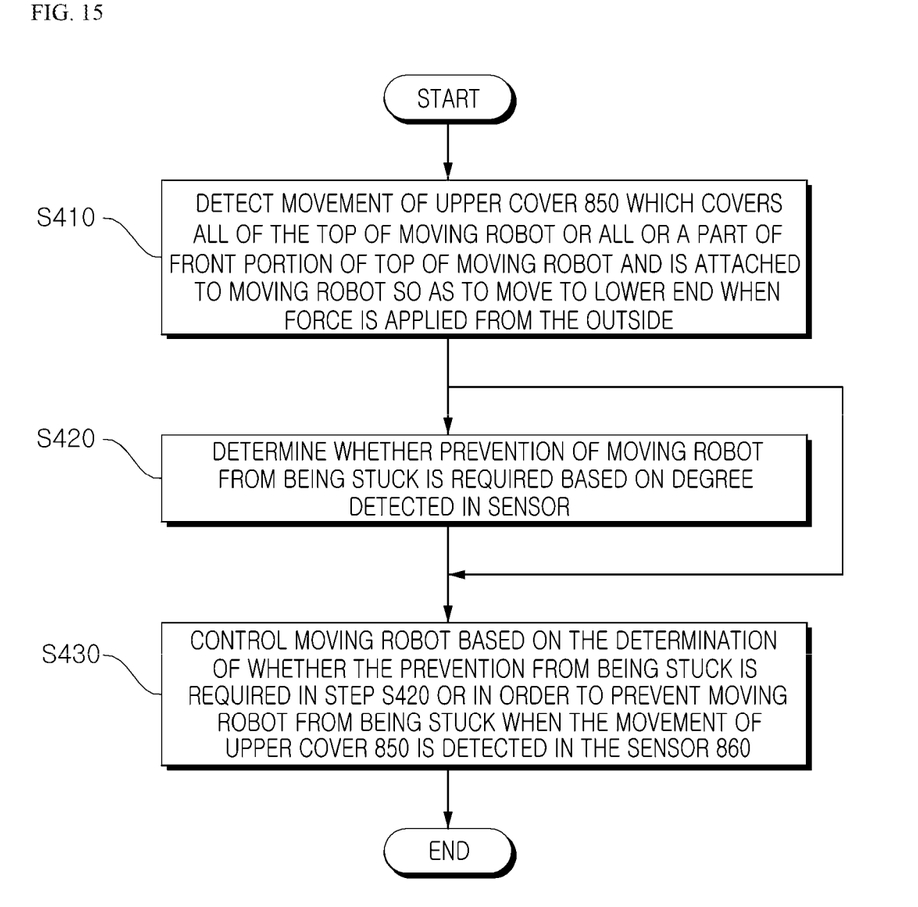
FIG. 15 is a flowchart of a catch preventing method of the cleaning robot according to the exemplary embodiment of the present invention.

FIG. 15 is a flowchart of a catch preventing method of the cleaning robot according to the exemplary embodiment of the present invention.

When the catch preventing method of the cleaning robot according to the exemplary embodiment is described with reference to FIG. 15, the sensor 860 covers the entirety of the cleaning robot upper end or the entirety or a part of the front portion of the cleaning robot upper end and senses the motion of the upper cover 850 attached to the cleaning robot so as move to the lower end when force is applied from the outside (step S410).

The determination unit 870 may determine whether prevention of the cleaning robot from being stuck is required based on the degree sensed by the sensor 860 (step S420).

The control unit 880 may control the cleaning robot in order to prevent the cleaning robot from being stuck based on the determination of the determination unit 870 or at the moment when the sensor 860 senses the motion of the upper cover 850 (step S430).

The cleaning robot and the cleaning robot catch preventing method can prevent the cleaning robot from being stuck even when the cleaning robot enters the lower end of an obstacle including a sofa, a bed, a decoration cabinet, a radiator, and the like, in which a lower height is small and a lower end is round or the lower end is made of a somewhat soft material.

In the cleaning robot and the method for preventing the cleaning robot from being stuck according to the present invention, the protrusion is not required in order to prevent the cleaning robot from being stuck in the lower end of the obstacle. Therefore, according to the present invention, a formative limit element of an exterior of the cleaning robot can be removed. That is, the upper end of the cleaning robot can be formed only by a curve or a linear shape to help aesthetic improvement of an appearance.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A cleaning robot comprising:
   a platform of which at least one corner of an exterior has an angle of less than 90°;
   a first driving wheel of which a central shaft is attached to a bottom portion of the platform at a predetermined fixed first angle θ with respect to a forward direction of the platform; and
   a second driving wheel of which a central shaft is attached to the bottom portion of the platform at a predetermined fixed second angle −θ with respect to the forward direction of the platform,
   wherein θ is greater than zero, such that the first and second driving wheels provide toe in or toe out for the cleaning robot, and
   wherein a driving direction of the cleaning robot is a straight vector that is a sum of vector directions of the respective first and second driving wheels.

2. The cleaning robot of claim 1, wherein the first and second driving wheels are offset from a horizontal central line of the platform perpendicular to the forward direction of the moving robot.

3. The cleaning robot of claim 1, wherein in the platform, the corner having an angle of less than 90° is a curved line, and an angle formed by straight edges extending from opposing ends of the curved line is less than 90°.

4. The cleaning robot of claim 1, wherein the exterior of the platform has two or more corners having the angle of less than 90° and a main cleaning module is disposed at a portion having the largest horizontal length of the platform of the cleaning robot.

5. The cleaning robot of claim 1, wherein the platform has three corners having the angle of less than 90° to form a triangular shape and the corners of the triangular shape are curved lines.

6. The cleaning robot of claim 1, further comprising:
   a sub cleaning module disposed on at least one corner of the exterior.

7. The cleaning robot of claim 1, wherein $0 \leq \theta \leq 20°$.

8. The cleaning robot of claim 1, further comprising:
   an upper cover disposed on an upper end of the platform and attached to the cleaning robot by moving to the bottom when force is applied from the outside;
   a sensor detecting movement of the upper cover when the upper cover moves to the bottom; and
   a determination unit determining whether preventing the cleaning robot from being stuck is required based on a sensing value detected in the sensor.

9. The cleaning robot of claim 8, wherein the determination unit generates a determination signal by comparing the sensing value with at least a predetermined reference value.

10. The cleaning robot of claim 9, further comprising:
    a controller controlling the first and second driving wheels so as to avoid the cleaning robot from being stuck in response to the determination signal.

11. The cleaning robot of claim 8, further comprising:
    a bumper at the front portion, wherein the upper cover is not physically coupled with the bumper.

12. The cleaning robot of claim 8, wherein the sensor is a sensor measuring pressure applied to the sensor by movement of the upper cover.

13. The cleaning robot of claim 8, wherein the upper cover returns to a state before the upper cover moves to the bottom when external force applied to the upper cover disappears.

14. The cleaning robot of claim 8, wherein the sensor is positioned at the front portion of the upper end of the cleaning robot.

15. The cleaning robot of claim 8, wherein the sensor is positioned at a place where a distance from the upper end of the cleaning robot is shortest when the upper cover moves to the bottom.

16. The cleaning robot of claim 1, wherein θ is from 8° to 15°.

* * * * *